Figure 1:
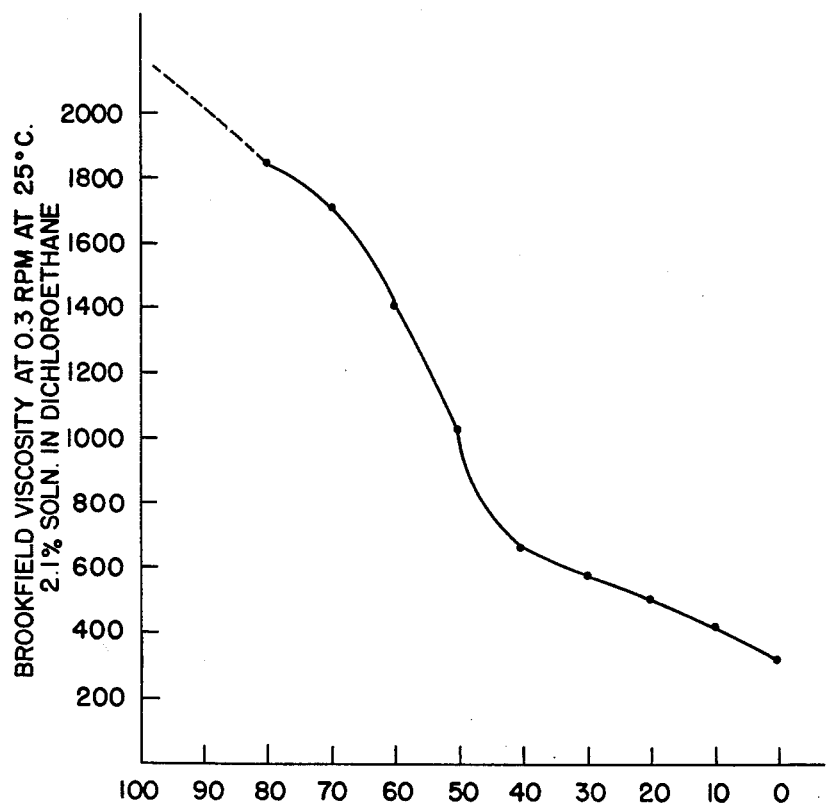

April 27, 1965 A. F. TURBAK 3,180,410
SECONDARY RECOVERY UTILIZING A WATER FLOODING TECHNIQUE
Filed May 27, 1960 2 Sheets-Sheet 1

MOLE % STYRENE IN MONOMER FEED
BEFORE SULFONATION

Albin F. Turbak  Inventor
By W.O. Heilman
Patent Attorney

United States Patent Office 3,180,410
Patented Apr. 27, 1965

3,180,410
SECONDARY RECOVERY UTILIZING A WATER FLOODING TECHNIQUE

Albin F. Turbak, New Providence, N.J., assignor to Jersey Production Research Company, a corporation of Delaware
Filed May 27, 1960, Ser. No. 32,470
13 Claims. (Cl. 166—9)

The present invention is broadly concerned with a secondary recovery process for the more effective and efficient recovery of oil from subterranean reservoirs. The invention is particularly directed to a secondary recovery operation wherein a fluid such as water is employed as a driving medium. The invention is especially concerned with an improved type of viscous water flooding process in which fingering and oil reservoir by-passing on the part of the driving fluid are substantially reduced by the utilization of a particular class of water thickening agents. These agents of the present invention are selected from the class of compounds comprising sulfonated polymers. Desirable polymers are polyvinyl aromatic sulfonates, as for example polyvinyl toluene sulfonates. Other desirable polymers are copolymers of a vinyl aromatic and styrene as for example copolymer of vinyl toluene and styrene. The present application is a continuation-in-part of U.S. Serial No. 795,324, now abandoned, filed February 25, 1959, entitled "Secondary Recovery Utilizing a Water Flooding Technique," inventor Albin F. Turbak.

In the recovery of oil from subterranean reservoirs, there have been substantial advances in primary recovery techniques so as to substantially increase the recovery of oil. However, an appreciable quantity of the oil remains in the reservoir after termination of the primary recovery methods. It is estimated that only about 30 to 50% of the oil can be economically recovered by primary recovery techniques. A greater amount may be recovered by other secondary techniques, such as re-pressuring treatments following the primary method.

Thus, there exists a great interest in secondary recovery methods. Secondary recovery is the recovery of additional quantities of oil from a reservoir after it is no longer economical to recover oil by primary recovery methods. For example, a secondary operation may be conducted by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of a number of secondary recovery procedures for removing oil from subterranean oil reservoirs is well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs. While conventional waterflooding is effective in obtaining additional oil from subterranean oil reservoirs, it has a number of shortcomings which detract seriously from its value. Foremost among these shortcomings is a tendency of flood waters to "finger" through a reservoir and to bypass substantial portions of the reservoir. In other words, a water drive has a less than perfect "sweep efficiency" in that it does not contact all portions of the reservoir. Furthermore it does not normally displace as much oil in the portions of the reservoir which it contacts as it theoretically is capable of doing.

The fingering tendency of a waterflood is usually explained by the fact that oil reservoirs possess regions and strata that have different permeabilities. The water flows more rapidly through those regions and strata having a greater relative permeability to water than in other portions of the reservoir. Waterflooding often completely misses substantial portions of the reservoir. The net result is an inefficient oil displacement action on the part of the water.

At this point, it should be noted that crude oils vary greatly in viscosity—some being as low as 1 or 2 cps. and some ranging up to 1000 cps. or even more. It has been established that waterflooding performs less satisfactorily with viscous crude oils than with relatively non-viscous oils. In other words, the fingering and bypassing tendencies of the water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a flooding operation or the like within an oil reservoir, it reads as follows:

$$\frac{M_o}{M_e} = \frac{\mu_e}{\mu_o} \frac{K_o}{K_e}$$

where $M_o$ is the mobility of the oil to the reservoir in question.
$M_e$ is the mobility of the flooding medium to the reservoir in question.
$\mu_o$ is the voscosity of the driven oil.
$\mu_e$ is the viscosity of the flooding medium.
$K_e$ is the relative permeability of the reservoir toward the flooding medium in the presence of residual oil.
$K_o$ is the relative permeability of the reservoir toward the oil in the presence of connate water.

This equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that are required to reduce the oil content of the reservoir to an ultimate equilibrium value. For example, a given volume of driving fluid operated at a mobility ratio of one or greater will displace a markedly greater volume of oil from a reservoir than will an equal volume of driving fluid operating at a mobility ratio of less than one.

Several procedures have been suggested to date for improving the mechanics of waterflooding procedures particularly with the view to reducing the degree of fingering and bypassing. One suggestion has been to increase the viscosity of the water drive relative to the oil by incorporating water soluble viscous agents within the water. Materials that have been suggested for this purpose include a wide variety of naturally occurring gums, sugars, and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally many of these materials are quite expensive and their use is not feasible from the standpoint of economics.

Accordingly it is an object of this invention to provide an improved type of displacement process in which a marked increase in the viscosity of the driving fluid may be readily attained. It is also an object of the invention to provide a viscous "waterflooding" process in which the increased viscosity of the flood water is attained inexpensively. It is still a further object of the invention to use a driving fluid whose viscosity is stable.

In accordance with the specific adaptation of the present invention, an improved class of water thickening agents is utilized. The improved agents of the present invention, as pointed out heretofore, comprise sulfonated polymers, as for example, polyvinyl toluene sulfonates, polystyrene sulfonates, or substituted polystyrene sulfonates.

The agents of the present invention have the following structural formula:

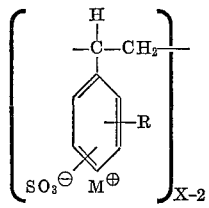

where R represents H, $CH_3$ or a group for which the Hammett function is known or readily determinable and which does not react with $SO_3$. (See Physical Organic Chemistry by J. Hine. Published by Wiley and Co., New York.) X represents the degree of polymerization and has values such that the molecular weight of the resulting polymer is greater than 100,000. $M^\oplus$ represents a cationic salt component and may be $Na^\oplus$, $K^\oplus$, $Li^\oplus$, $NH_4^\oplus$, $CH_3NH_3^\oplus$, $C_2H_5-NH_3^\oplus$, $C_3H_7NH_3^\oplus$, $C_4H_9NH_3^\oplus$, $C_5H_{11}NH_3^\oplus$,

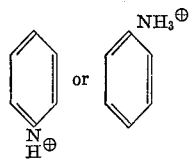

or other amine.

The relative substituent position of R to $-SO_3^\ominus$ and $M^\oplus$ to the styryl group is considered to be non-limiting except by reason of ease of preparation. Thus, for example, in the case of polyvinyl toluene sulfonate prepared by polymerization of a mixed ortho and paravinyl toluene monomer, as is generally commercially supplied, the sulfonate would enter respective positions along the chain in accordance with the generally well established rules of organic chemistry; each position being determined by the relative positions already occupied on the aromatic nucleus by the polymer backbone and the methyl group. In the case of polystyrene, the sulfonate would enter ortho and para to the position linked to the polymer backbone.

Other desirable thickening agents of the present invention comprise sulfonated copolymers as for example a sulfonated copolymer of vinyl toluene and styrene or substituted polymers.

These particular agents of the present invention have the following general structure formula

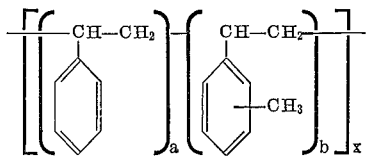

where the ratio of $a/b$ would vary from 2/3 to 3/2. The value of $x$ is such as to give a molecular weight range from 500,000 to 10 million with a preferred range being from 1 to 5 million.

In preparing the basic polymer for subsequent sulfonation, a wide range of molecular weights can be produced by variation of such factors as catalyst, temperature and type of polymerization; that is, whether polymerization is performed by solution, bulk or emulsion techniques.

In general, it is preferable to use emulsion methods since these methods produce higher molecular weights at more rapid rates. Many emulsion homopolymers were prepared using the following formulations:

(A) 100 cc. $H_2O$
 52 g. monomer (vinyl toluene)
 3.0 cc. sulfated aryl ether soap
 0.25 g. azobisisobutyronitrile catalyst
(B) Same as above but using:
 0.25 g. potassium persulfate catalyst and
 0.10 g. sodium bisulfite activator in place of the azobisisobutyronitrile catalyst
(C) Same as (A) but using:
 0.150 g. cumes hydroperoxide catalyst and
 0.075 g. sodium bisulfite activator in place of the azobisisobutyronitrile catalyst The above was repeated using styrene as the monomer.
Many emulsion copolymers were prepared using the following formulations:

(D) To 200 cc. of distilled water add:
 52 g. styrene (dist.)
 59 g. vinyl toluene (dist.)
 6.00 cc. sulfonated aryl ether soap
 0.50 g. azobisisobutyronitrile
(E) Same as above but using:
 0.50 g. potassium persulfate catalyst and
 0.20 g. sodium bisulfite activator in place of the azobisisobutyronitrile catalyst
(F) Same as (D) but using:
 0.30 g. cumene hydroperoxide catalyst and
 0.150 g. sodium bisulfite activator in place of the azobisisobutyronitrile catalyst The formulations were then either—
(1) Canned under nitrogen atmosphere and run at 46° C. (or other temperature above room temperature) in a constant temperature apparatus with agitation (i.e. a laundrometer).
(2) Placed under nitrogen atmosphere in a bottle and shaken at room temperature.

After the monomer polymerized, the slurry was diluted with 400 cc. of $H_2O$ and the polymer was coagulated by adding 15 grams of NaCl. The product was filtered and washed until no positive test for chloride could be obtained with the wash liquor. The product was dried in a vacuum oven at 65° C. and 200 mms. pressure for 12 to 15 hours.

Comparative molecular weight levels produced by various conditions were measured by preparing 2.1% solution in dichloroethane and measuring the viscosity at 25° C. using a Brookfield Viscosimeter fitted with a U.L. Adapter—the higher the viscosity, the greater the molecular weight.

The results from this investigation are listed in Table I where, for comparison purposes, several bulk polymer values are also included.

TABLE I

*Effect of catalyst and temperature on molecular weight of styrene and vinyl toluene emulsion polymers*

| Monomer used | Temperature of polymerization (° C.) | Catalyst used | 2.1% viscosity in dichloroethane at 25° C. |
|---|---|---|---|
| Styrene | 46 | $K_2S_2O_8$-$NaHSO_3$ | 11.48 |
| Do | 25 | $K_2S_2O_8$-$NaHSO_3$ | 124.4 |
| Do | 46 | Cumene hydroperoxide-$NaHSO_3$ | 15.0 |
| Do | 25 | do | 119.0 |
| Do | 46 | Azobisisobutyronitrile | >2,000 |
| Styrene [1] | 25 | Benzoyl peroxide | 5.24 |
| Styrene [1] [2] | 25 | None—Polymerized on standing on shelf | 125.0 |
| Vinyl toluene | 46 | $K_2S_2O_8$-$NaHSO_3$ | 10.0 |
| Do | 25 | $K_2S_2O_8$-$NaHSO_3$ | 40.0 |
| Do | 25 | Cumene hydroperoxide-$NaHSO_3$ | 22.6 |
| Do | 46 | Azobisisobutyronitrile | 160.0 |
| Do | 35 | do | 254.0 |
| Do | 25 | do | 608.0 |
| Vinyl toluene [1] [2] | 25 | None—Polymerized on standing on shelf | 43.0 |

[1] Bulk polymerization not emulsion—values included for comparative purposes.
[2] Not a commercially feasible method but illustrates the highest limit to be expected for a bulk polymerization procedure.

It is obvious from the data in Table I that wide variations in base polymer molecular weight result from the different conditions employed.

It has been found that base polymers having a 2.1% dichloroethane viscosity higher than 20 cp. produced the best thickeners upon subsequent sulfonation. The very high viscosity products yielded sulfonates which are effective at 0.10%–0.15% in salt water.

The product homopolymers and copolymers may be sulfonated using any recommended procedure for sulfonation, but those procedures which are easily reproducible and can be controlled closely with regard to cross linking are most useful for our purpose. The polymer was sulfonated in dichloroethane as solvent.

The particular method to produce a sulfonic acid of the polymer was to add the polymer to complexed $SO_3$ prepared by adding $SO_3$ to triethyl phosphate dissolved in dichloroethane. As the polymer sulfonates, the sulfonic acid polymer structure precipitates from solution. This precipitate was filtered and washed with dichloroethane and then dissolved in methanol. The salts were prepared using a methanol solution.

It is felt that the salts of the sulfonic acid polymers are more desirable for use in reservoirs since they have a better aging life and are more stable. The salts are less corrosive than the acids. Furthermore, the pH of the salts approximate the pH of the reservoir and thus are less likely to upset equilibrium reservoir conditions. Also in limestone reservoirs it is necessary to avoid acid since it would tend to attack the rock.

The different salt preparations of the sulfonic acid polymers were prepared as follows:

(1) *Sodium salt.*—(a) Polystyrene sulfonate—to the methanol solution add 3 cc. of 1% phenophthalein and with stirring add dropwise a 50% solution of NaOH until the phenophthalein characteristic end point is reached. Centrifuge the product and decant the excess alcohol liquor. Transfer the gel-like solid to an evaporating dish and dry in a vacuum oven at 65° and 200 mm. pressure for 15 to 20 hours.

(b) Polyvinyl toluene sulfonate—in this case follow a similar procedure except that after neutralization with the 50% NaOH, the liquor is taken down to about a 100 cc. volume on a steam bath and the resulting mass is hardened by adding 400 to 500 cc. of acetone. The product is ground under acetone, filtered and dried in a vacuum oven.

(2) *Ammonium salt.*—Place the methanol solution in a beaker and bubble in some gaseous ammonia for about 5 minutes or until the solution gets slightly cloudy. Place on a steam bath and evaporate down to about 100 cc. total volume. Add 500 cc. of acetone and allow the precipitate to harden. Filter and dry in a vacuum oven.

(3) *n-Butyl amine salt.*—To the methanol solution add an excess of n-butyl amine. Heat lightly on a steam bath and then precipitate the salt by adding acetone. Filter and dry.

(4) *Anilinium salt.*—Prepare similarly to the n-butyl amine salt.

(5) *Tri-n-butyl amine salt.* — Add an excess of the amine to the sulfonic acid solution and heat on a steam bath to a very small volume. Harden by adding diether (250 cc.) and then grind under new ether. It should be noted that acetone was not effective in precipitating this salt. The precipitated salt was filtered and air dried to remove excess ether and then was oven dried.

The salts of the sulfonated copolymers may be prepared in a similar manner.

As pointed out heretofore, the polymer may be sulfonated by a number of procedures. However, a preferred procedure is as follows:

Dissolve the polymer in a suitable solvent (dichloroethane or other inert solvent) and add to a dichloroethane solution containing $SO_3$ which has been complexed with a phosphorus containing compound (triethyl phosphate). The resulting sulfonation is rapid and smooth and reproducibly yields a precipitated sulfonate which is substantially free from cross links and has superior water solubility as compared to products prepared by other methods.

The extent at which the copolymer is sulfonated is sufficient to render the sulfonated polymer water soluble. In effect this means that at least 70 to 75 mol percent of the aromatic rings must be sulfonated. It is preferred that at least 90% of the aromatic rings be sulfonated. The polymer used in the present invention contains 14.2 to 15.2 wt. percent of sulfur which corresponds to about 95 to 100% sulfonation of the aromatic rings.

The precipitated sulfonated polymer is removed and washed with dichloroethane before adding the polymer to a solvent for the preparation of the salt.

In order to further illustrate the invention, a number of these polymers were tested with the following results:

Example 1

The polymer tested was a polyvinyl toluene sulfonate prepared as its sodium salt having a molecular weight above 100,000.

(A) VISCOSITY—CONCENTRATION BEHAVIOR

| Conc., percent | Kinematic viscosity (centipoises) at 60° C. | |
|---|---|---|
| | In distilled water | In salt water [1] |
| 0 | 0.5 | 0.5 |
| 0.25 | 3.4 | 1.8 |
| 0.50 | 6.5 | 4.3 |
| 0.75 | 10.8 | 7.7 |
| 1.00 | 14.0 | 11.9 |

[1] Salt water=40 liters of water contain 2.72 grams sodium bicarbonate, 4.28 grams sodium sulfate, 5.52 grams magnesium chloride, 3.56 grams calcium chloride, 36.5 grams sodium chloride and 2.05 grams aluminum sodium sulfate—$(Al_2(SO_4)_3Na_2SO_4 \cdot 24H_2O)$.

(B) VISCOSITY—pH

Brookfield viscosity, cp. at 25° C.: pH
- 37.0 — 6.55
- 37.5 — 8.55
- 36.3 — 9.03
- 37.3 — 9.15
- 37.5 — 9.25
- 36.3 — 9.37
- 36.9 — 9.49
- 37.7 — 9.59
- 37.8 — 9.67
- 37.0 — 9.78
- 36.7 — 9.82
- 37.7 — 10.00
- 36.7 — 10.12
- 38.2 — 10.35
- 37.3 — 10.48
- 37.8 — 10.60

HYDROSULFITE REDUCING TEST

| Material | Immediately after adding | | After 1 hr. | | After 24 hrs. | | After 48 hrs. | | Reflux 16 hrs. | |
|---|---|---|---|---|---|---|---|---|---|---|
| | pH | Visc. | pH | Visc. | pH | Visc. | pH | Visc. | pH | Visc. |
| 100 cc. polymer 1% soln. plus 2 cc. of 1% hydrosulfite soln | 7.4 | 36.0 | 7.4 | 30.0 | 6.4 | 25.4 | 6.55 | 25.6 | 4.57 | 15.4 |
| 100 cc. polymer 1% soln. plus 2 cc. of 0.556% NaCl soln | 8.4 | 37.4 | 8.45 | 37.4 | 8.35 | 36.6 | 8.20 | 37.0 | 8.70 | 29.8 |

Initial pH=8.35; Initial visc.=40.2.

The above data indicate there is very little difference when these compounds are used in distilled water as compared to salt water, and that these polymers are not very sensitive to wide changes in pH. Thus, they differ substantially from carboxylic acid type polymers which are extremely changed in viscosity over small ranges of pH; most carboxylic acid losing 60 to 90% of their viscosity over the pH range used here.

EXAMPLE 2

The polymer in Example 1 was also tested for thermal stability with the following results:

100° C. AGING

| Conc. (percent) in salt water | Hours refluxed | | | | | | | |
|---|---|---|---|---|---|---|---|---|
| | 0 | 1 | 17 | 22 | 39 | 66 | 90 | 114 |
| 0.5: | | | | | | | | |
| Visc | 4.3 | 4.1 | 3.7 | 3.7 | 3.6 | | | |
| pH | 7.0 | 8.1 | 8.4 | 8.5 | 8.5 | | | |
| 0.75: | | | | | | | | |
| Visc | 8.1 | 7.5 | 6.6 | 6.6 | 6.4 | | | |
| pH | 6.8 | 7.7 | 8.4 | 8.4 | 8.4 | | | |
| 1.0: | | | | | | | | |
| Visc | 12.2 | 12.8 | | | | 9.3 | 8.7 | 8.5 |
| pH | 6.7 | 8.1 | | | | 8.1 | 7.9 | 7.8 |
| 1.0: | | | | | | | | |
| Visc | 12.3 | 12.8 | | | | 10.5 | 10.0 | 10.1 |
| pH | 9.7 | 9.3 | | | | 8.3 | 8.2 | 8.1 |

BOMB AGING
[Stainless steel bomb]

| Conc. (percent) in salt water | Days aged at 107° C. | | | | |
|---|---|---|---|---|---|
| | 0 | 1 | 3 | 10 | 17 |
| 1.0: | | | | | |
| Visc | 16.5 | 14.2 | 13.3 | 12.9 | 11.9 |
| pH | 8.8 | 8.3 | 8.2 | 8.0 | 7.8 |

The above data indicate very good thermal stability. Many other polymers tested under these same conditions lose between 75%–95% of their initial viscosities.

EXAMPLE 3

The polymer of Example 1 was tested for stability using a standard reducing test.

From the above it is apparent that the polymer has good stability since most other polymers degrade rapidly to less than 50% of initial value in 24 hours.

The hydrosulfite test gives a measure of the number of reducible linkages that are present in the polymer and so gives an indication of the way the polymer would behave in the presence of the reducing conditions that it may be exposed to in the ground during an actual water flooding procedure. The comparison data using only NaCl at the same ionic strength are given so that effects due strictly to salt interactions can be taken into account. Such salt effects are not to be considered as degradation in this test.

EXAMPLE 4

Polyvinyl toluene was prepared by the emulsion polymerization of formulation (A), the ingredients of which are listed in column 4, lines 24–27. The polymer was then sulfonated and the polyvinyl toluene sulfonate was neutralized with sodium hydroxide to produce the corresponding sodium salt. The thermal stability of the salt was tested at refluxing conditions as follows:

100° C. AGING

| Conc. (percent) in lake water | Hours refluxed | | | | | |
|---|---|---|---|---|---|---|
| | 0 | 1 | 4 | 28 | 52 | 76 |
| 0.28: | | | | | | |
| Visc | 5.8 | 5.8 | 5.7 | 4.5 | 6.4 | 6.1 |
| pH | 7.7 | 8.0 | 8.2 | 8.6 | 8.5 | 8.4 |

The above indicates that the polymer has very excellent thermal stability.

EXAMPLE 5

The polymer of Example 4 was also tested under the hydrosulfite test with the following results:

HYDROSULFITE REDUCING TEST

| Material | Immediately after adding | | 1 hr., 25° C. | | 65 hrs., 25° C. | | 150 hrs., 25° C. | | 2 hrs., Reflux | | 20 hrs., Reflux | |
|---|---|---|---|---|---|---|---|---|---|---|---|---|
| | pH | Visc. | pH | Visc. | pH | Visc. | pH | Visc. | pH | Visc. | pH | Visc. |
| 100 cc. of 0.4% soln. plus 2 cc. of 1% hydrosulfite solution | 6.4 | 49.5 | 6.6 | 49.2 | 7.75 | 49.0 | 4.5 | 46.0 | 3.8 | 44.4 | 3.9 | 41.0 |
| 100 cc. of 0.4% soln. plus 2 cc. of 0.556% NaCl solution | 7.6 | 50.0 | 7.8 | 51.2 | 7.0 | 50.7 | 7.0 | 50.8 | 8.6 | 76.0 | 9.4 | 53.4 |

Initial pH=7.75. Initial visc.=56.4 cp. at 25° C.

The above data indicate the polymer to have exceptionally good stability towards reducing agents.

The polymers of the present invention fulfill the following requirements:

(1) High viscosities in salt solutions at low concentrations of polymer.
(2) Stability of aqueous solutions at elevated temperatures for extended periods of time.
(3) Stability of viscosity over a broad pH region.
(4) Stability to reducing action.

EXAMPLE 6

With respect to the sulfonated copolymers of the present invention a number of tests were made comparing a 50–50 mixture of styrene and vinyl toluene which were copolymerized, with a 50–50 mixture of homopolymers of styrene and vinyl toluene.

Comparative molecular weight levels produced by various conditions were measured by preparing 2.1% solution in dichloroethane and measuring the viscosity at 25° C. using a Brookfield Viscosimeter fitted with a U.L. Adapter—the higher the viscosity, the greater the molecular weight.

The viscosities of the respective polymers produced were as follows.

Polymer:     2.1% dichloroethane visc. (cp.) at 25° C. 0.3 r.p.m.
- Vinyl toluene homopolymer _____ 310
- Styrene homopolymer _____ 390
- 50–50 copolymer (styrene plus vinyl toluene) __ 420

The above polymers were prepared using the emulsion technique as described in procedures (A) and (D). The temperature used was 30–35° C.

The above polymers were then sulfonated as follows:

10 grams of polymer dissolved in 476 cc. of dichloroethane was added at room temperature in a slow stream to a complex prepared by adding 16.8 cc. of $SO_3$ to 24.4 grams of triethylphosphate dissolved in 500 cc. of dichloroethane. The product precipitates practically instantaneously. After 10 minutes, the solid is filtered, washed with two 200 cc. portions of dichloroethane and then dissolved in methyl alcohol. To this solution is added 3 cc. of 1% alcoholic phenophthalein and the liquor is neutralized with 50% NaOH, filtered, washed with acetone, and dried. Yield=21.9 grams of a white powder.

The following tests illustrated in Tables II, III, IV, and V were used on the respective sulfonated sodium neutralized polymers:

Comparative data of mixture vs. 50–50 copolymer.

0.2% solutions in Lake Water [1] (1500 p.p.m. dissolved salts).

TABLE II

*Thickening power*

| Polymer sulfonate | pH | Visc. (cp.) at 140° F. using Brookfield Viscosimeter | | |
|---|---|---|---|---|
| | | 30 r.p.m. | 3.0 r.p.m. | 0.3 r.p.m. |
| Mixture | 7.7 | 6.50 | 10.40 | 16.00 |
| Copolymer | 7.3 | 12.56 | 24.4 | 50.0 |

It is apparent that this is a true copolymer, not a blend of homopolymers and also it has better thickening power.

[1] Salt water=40 liters of water contain 2.72 grams sodium bicarbonate, 4.28 grams sodium sulfate, 5.52 grams magnesium chloride, 3.56 grams calcium chloride, 36.5 grams sodium chloride and 2.05 grams aluminum sodium sulfate—$(Al_2(SO_4)_3Na_2SO_4.24H_2O)$.

TABLE III

*Calcium sensitivity*

| Added calcium (p.p.m.) | Mixture, visc. (c.p. at 140° F.) | | | Copolymer, visc. (c.p. at 140° F.) | | |
|---|---|---|---|---|---|---|
| | 30 r.p.m. | 3.0 r.p.m. | 0.3 r.p.m. | 30 r.p.m. | 3.0 r.p.m. | 0.3 r.p.m. |
| 160 | 3.0 | 4.0 | 8.0 | 6.8 | 12.0 | 16.0 |
| 320 | 2.0 | 2.6 | 6.0 | 4.5 | 7.8 | 12.0 |
| 640 | 1.4 | 1.8 | 4.0 | 3.0 | 5.0 | 6.0 |

TABLE IV

*Flow stability*

| Pore volume throughout | Percent initial viscosity retained | |
|---|---|---|
| | Mixture | Copolymer |
| 1.25 | 78 | 81 (88) |
| 1.50 | 86 | 97 (97) |
| 1.75 | 87 | 97 (97) |
| 2.00 | 86 | 95 (96) |

Figure in parentheses denotes a repeat run.

Thus the 50–50 copolymer flows better than the mixture of homopolymers.

TABLE V

*Reflux stability*

| Hours aged at 100° C. | Percent visc. retention (reported as visc./pH) | |
|---|---|---|
| | Mixture | Copolymer |
| 0 | 6.24/6.82 | 12.38/7.13 |
| 23 | | 7.52/8.46 |
| 47 | | 8.64/8.18 |
| 96 | 5.34/8.38 | |
| 240 | | 6.60/7.65 |
| 288 | 5.00/7.78 | |

Thus although the copolymer retains a lower percentage of its initial viscosity, the actual magnitude of the final viscosity is higher.

Figure 2:
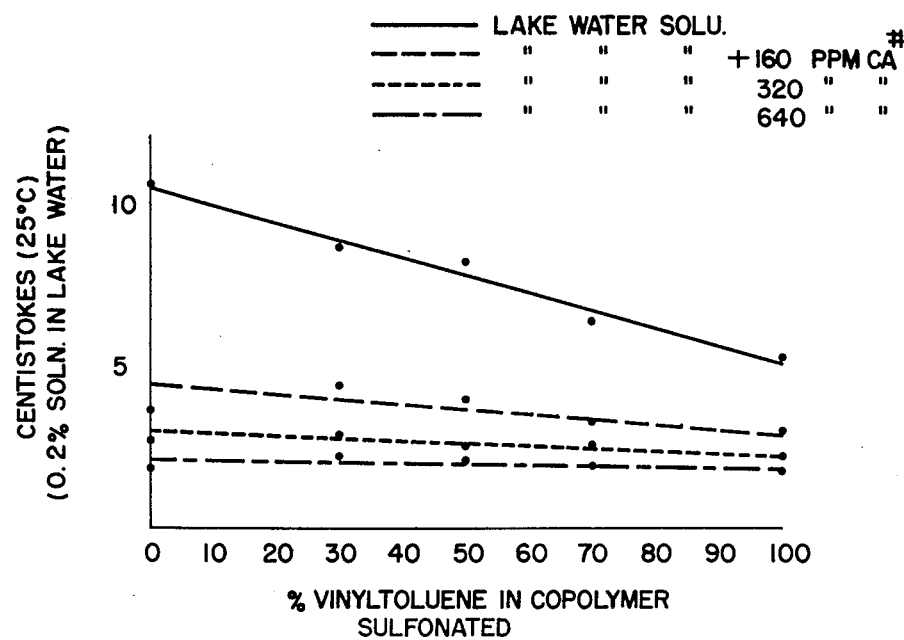

Additional tests were conducted to determine the effect of various percentages of styrene in the copolymer before sulfonation. The results of these tests were illustrated in FIGURE 1. It is apparent that the viscosity and thus the molecular weight of styrene-vinyl toluene copolymers increases with increasing styrene content in the monomer feed. However, although the data present in FIGURE 1 illustrate that the molecular weight of the copolymer increases with increasing styrene content, it is apparent from the data presented in FIGURE 2, that this advantage is not retained in the presence of salt. The data presented in FIGURE 2 illustrate the thickening power and the calcium sensitivity of the copolymer sulfonates with various calcium concentrations and with various amounts of vinyl toluene present in the copolymer. In general, the amount of styrene present in the polymer before sulfonation may vary from about 70 to 30%. However, it is preferred to have the amount of styrene present in the polymer in the range from about 40 to 60%.

From the data presented in FIGURE 2 it is evident that—

(1) The thickening power decreases with increasing vinyl toluene content. This relationship is paralleled by that between copolymer composition and molecular weight of the pre-copolymers.

(2) Calcium has a levelling effect on the thickening efficiency. The most efficient thickeners suffer the greatest percentage loss due to $Ca^{++}$.

(3) The first 160 p.p.m. of $Ca^{++}$ seemed to do the most damage.

That the polymerization of a monomer feed of 50–50 mol percent styrene and vinyl toluene will give a copolymer containing about 47–50% styrene is substantiated by the following:

F. W. Northland and Weldon G. Brown have reported on a study of the copolymer reactivity ratios of styrene and the vinyl toluenes using $C_{14}$— tagged styrene (J. Am. Chem. Soc. 78, 469 (1956)).

They have reported the following copolymer reactivity ratios.

| Monomer, $M_2$ | $r_1$ | $r_2$ |
|---|---|---|
| O-vinyl toluene | 0.90 | 0.89 |
| p-Vinyl toluene | 1.02 | 1.21 |

The vinyl toluene which we use here is a mixture of ortho and para vinyl toluene. Therefore, the composition of our copolymer will lie somewhere between the values for pure ortho and pure para vinyl toluene.

Using the equation:

$$r_2 = \frac{M_1}{M_2}\left[\frac{m_2}{m_1}\left(1+\frac{M_1}{M_2}r_1\right)-1\right]$$

where
$r_2$=the reactivity ratio of the vinyl toluene
$r_1$=the reactivity ratio of styrene
$M_1$=conc. of styrene in monomer feed
$M_2$=conc. of vinyl toluene in monomer feed
$m_1$=conc. of styrene in copolymer
$m_2$=conc. of vinyl toluene in copolymer It is seen that polymerization of a 50–50 monomer feed of styrene-ortho-vinyl toluene gives a copolymer containing 50.1% styrene, while a 50–50 monomer feed of styrene-para-vinyl toluene gives a copolymer containing 47.5% styrene. Therefore, our copolymer contains 47.5 to 50.1% styrene and 52.5 to 49.9% ortho and para vinyl toluene.

EXAMPLE 7

A sulfonated copolymer of the present invention prepared from a 50–50 mol percent of styrene and vinyl toluene was passed through a column containing reservoir sand at 140° F. 320 p.p.m. $Ca^{++}$ and 0.5% formalin were added to the 0.3% solution of polymer in simulated Lake Water to stabilize the solution against ion-pick up and thermal degradation, respectively. The viscosity retention data on effluent samples are listed in Table VI.

TABLE VI

*Good viscosity retention and oil production obtained in flow test*

| Cumulative P.V. injected | Cumulative P.V. oil Prodn. | Cumulative P.V. water prodn.[1] | Viscosity retention (as fraction of initial viscosity) |
|---|---|---|---|
| 0.67 | 0.63 | 0.04 | 0.15 |
| 0.80 | 0.67 | 0.13 | 0.45 |
| 0.86 | 0.68 | 0.18 | 0.81 |
| 0.96 | 0.69 | 0.27 | 1.07 |
| 1.02 | 0.69 | 0.33 | 1.26 |
| 1.10 | 0.70 | 0.40 | 1.33 |
| 1.16 | 0.70 | 0.46 | 1.36 |
| 1.22 | 0.71 | 0.51 | 1.35 |
| 1.26 | 0.71 | 0.55 | 1.34 |
| 1.40 | 0.72 | 0.68 | 1.22 |
| 1.49 | 0.73 | 0.76 | 1.07 |
| 1.61 | 0.73 | 0.88 | 0.67 |
| 1.81 | 0.73 | 1.08 | 0.64 |

[1] Includes 0.13 P.V. connate water prodn.

The polymers of the present invention fulfill the following requirements:

(1) High viscosities in salt solutions at low concentrations of polymer.
(2) Stability of aqueous solutions at elevated temperatures for extended periods of time.
(3) Stability of viscosity over a broad pH region.
(4) Stability to reducing action.

EXAMPLE 8

Additional tests were conducted with respect to the sulfonated polystyrene and the sulfonated polyvinyl toluene as compared to the sulfonated copolymer of styrene and vinyl toluene. All polymers were prepared as hereinbefore described and neutralized to form the sodium salts.

The results of these tests with respect to salt sensitivity are illustrated in the following table:

TABLE VII

*Polyvinyl toluene sulfonates are less sensitive to calcium than polystyrene sulfonates*

| Polymer | Viscosity, 0.2% lake water | Viscosity, 0.2% lake water plus 160 p.p.m. $Ca^{++}$ | Percent retention |
|---|---|---|---|
| Polystyrene | 11.5 | 5.0 | 44 |
| Do | 16.2 | 5.5 | 34 |
| Polyvinyl toluene | 9.2 | 5.0 | 55 |
| Do | 13.8 | 7.3 | 53 |
| Do | 15.9 | 8.0 | 50 |
| Copolymer (50-50 styrene-toluene) | 19.3 | 9.8 | 51 |

From the above, it is apparent that the sulfonated copolymer is substantially equivalent as compared to the polyvinyl toluene with respect to salt sensitivity and superior to the polystyrene.

EXAMPLE 9

Further tests were conducted with respect to the thermal stability of the sulfonated homopolymers and copolymers of the present invention. The polymers were prepared as hereinbefore described and neutralized with a sodium hydroxide solution.

The results of these tests are illustrated in the following table:

TABLE VIII

*Polystyrene sulfonates possess better thermal stability than polyvinyl toluene sulfonates*

| Hours aged at 60° C. | Percent viscosity retention | | |
|---|---|---|---|
| | Polystyrene | Copolymer, 50-50 styrene vinyl toluene | Polyvinyl toluene |
| 0 | 100 | 100 | 100 |
| 40 | 98 | 90 | 92 |
| 80 | 95 | 87 | 85 |
| 120 | 93 | 86 | 80 |
| 160 | 91 | 85 | 76 |
| 200 | 91 | 84 | 74 |
| 240 | 91 | 84 | 74 |
| 280 | 91 | 80 | 72 |
| 320 | 91 | 78 | 70 |

From the above, it is apparent that the polystyrene is superior with respect to thermal stability as compared to the copolymer and the vinyl toluene. However, when the data of Table VII are considered, wherein the copolymer has a better salt sensitivity, it is apparent that the copolymer is superior.

The molecular weights of the polymers of the present invention should be in excess of about 100,000. In general, preferred polymers should be above about 500,000, preferably, above 1,000,000. The molecular weights may be as high as 3,000,000 to 5,000,000, or up to 10,000,000 and higher. When a polymer has a molecular weight in the range from 500,000 to 5,000,000, it should be used in the concentration of less than about 3% by weight, preferably, in the range from 0.05 to 0.5% by weight.

The required viscosity of the viscous water solution depends on a number of characteristics of the system in which it is applied:

(A) Viscosity of crude to be displaced.
(B) Wetting characteristics of the reservoir.
(C) Relative permeability to oil and water.

To obtain an advantage with viscous water, the viscosity does not have to equal the viscosity of the crude oil, but should be high enough to give a favorable mobility ratio. For example, a particular reservoir which is water wet and contains a crude with 40 cp. average viscosity at reservoir temperature, would require a 12–15 cp. solution of thickener for efficient flooding.

Thermal stability of viscous solutions may be defined in terms of the following measurement:

The exposure of the material to elevated temperatures for certain periods of time; for example, refluxing under a blanket of nitrogen for a specified period of time. The percent viscosity retention may be taken as a measure of stability to heat aging.

What is claimed is:

1. A process for displacing oil from a subterranean oil reservoir which comprises injecting viscous water into the reservoir through an injection well in a quantity sufficient to displace oil from at least a portion of the reservoir to a production well spaced from the injection well, said viscous water comprising from about 0.01 to 3 weight percent of sulfonated aromatic polymers having molecular weights in the range from 100,000 to 10,000,000, at least 75 mole percent of the aromatic rings of said polymers being sulfonated.

2. A process for displacing oil from a subterranean oil reservoir which comprises injecting viscous water into the reservoir through an injection well in a quantity sufficient to displace oil from at least a portion of said reservoir to a production well spaced from said injection well, said viscous water containing from about 0.05 to 3 weight percent of sulfonated vinyl aromatic polymers having molecular weights in the range from 100,000 to 10,000,000, at least 75 mole percent of the aromatic rings of said polymers carrying a sulfonate substituent.

3. A process as defined by claim 2 wherein said polymers comprise polyvinyl toluene sulfonates.

4. A process as defined by claim 2 wherein said polymers comprise polystyrene sulfonates.

5. A process as defined by claim 2 wherein said polymers comprise polystyrene-polyvinyl toluene copolymer sulfonates.

6. A process for displacing oil from a subterranean oil reservoir which comprises injecting viscous water into the reservoir through an injection well in a quantity to displace oil from at least a portion of said reservoir through an output well spaced from said injection well, said viscous water comprising from about 0.05 to 5 weight percent of metal salts of sulfonated aromatic polymers, said polymers also being characterized by having a molecular weight in the range from about 500,000 to 10,000,000, at least 75 mole percent of the aromatic rings of said polymer salts being sulfonated.

7. A process as defined by claim 6 wherein said salts comprise alkali metal salts.

8. A process for displacing oil from a subterranean oil reservoir which comprises injecting viscous water within the reservoir through an input well in a quantity to displace oil from at least a portion of said reservoir through an output well spaced from the input well, said viscous water comprising metal salts of sulfonated aromatic copolymers having molecular weights in the range from 500,000 to 10,000,000 and present in a concentration from 0.05 to 0.5 weight percent, said copolymers being further characterized by having the aromatic rings therein sulfonated to at least 75 mole percent.

9. A process as defined by claim 8 wherein said copolymers comprise copolymers of styrene and a substituted vinyl aromatic.

10. A process as defined by claim 8 wherein said copolymers comprise copolymers of vinyl toluene and styrene.

11. A process for displacing oil from a subterranean oil reservoir which comprises injecting viscous water in the reservoir through an injection well in a quantity sufficient to displace oil from at least a portion of the reservoir to a production well spaced from the injection well, said viscous water comprising from about 0.01 to 3 weight percent of vinyl aromatic polymers having molecular weights in the range from 100,000 to 10,000,000, said polymers having been sulfonated to provide the necessary water solubility.

12. A process as defined by claim 11 wherein said polymers comprise polyvinyl toluene sulfonates.

13. A process as defined by claim 11 wherein said polymers comprise polystyrene sulfonates.

References Cited by the Examiner

UNITED STATES PATENTS

| | | | |
|---|---|---|---|
| 2,612,485 | 9/52 | Baer et al. | 252—8.5 |
| 2,650,905 | 9/53 | Fordyce et al. | 252—8.5 |
| 2,663,700 | 12/53 | Roth et al. | 260—29.6 |
| 2,731,414 | 1/56 | Binder et al. | 166—9 |
| 2,835,655 | 5/58 | Bauman et al. | 260—29.6 |
| 2,842,492 | 7/58 | Engelhardt et al. | 166—9 |
| 3,053,765 | 9/62 | Sparks | 166—9 |
| 3,087,539 | 4/63 | Maurer | 166—9 |

CHARLES E. O'CONNELL, *Primary Examiner.*